United States Patent [19]

Mills

[11] Patent Number: 5,485,539
[45] Date of Patent: Jan. 16, 1996

[54] FIBER OPTIC RIBBON CABLE SUBUNIT BEARING PRINTED INFORMATION

[75] Inventor: Gregory A. Mills, Claremont, N.C.

[73] Assignee: Siecor Corporation, Hickory, N.C.

[21] Appl. No.: 283,869

[22] Filed: Aug. 1, 1994

[51] Int. Cl.⁶ ..................................... G02B 6/44
[52] U.S. Cl. ........................................... 385/114
[58] Field of Search ............................... 385/114

[56] References Cited

U.S. PATENT DOCUMENTS

| | | | |
|---|---|---|---|
| 4,370,542 | 1/1983 | Mills et al. | 101/35 |
| 4,629,285 | 12/1986 | Carter et al. | 350/114 |
| 4,900,126 | 2/1990 | Jackson et al. | 385/114 |
| 5,082,347 | 1/1992 | Akasaka et al. | 385/114 |
| 5,223,062 | 6/1993 | Tanihira et al. | 174/112 |
| 5,379,363 | 1/1995 | Bonicel et al. | 385/114 |

FOREIGN PATENT DOCUMENTS

| | | |
|---|---|---|
| 405109322 | 4/1993 | Japan . |
| 1236438 | 6/1971 | United Kingdom . |
| 1432548 | 4/1976 | United Kingdom . |

*Primary Examiner*—Akm E. Ullah
*Attorney, Agent, or Firm*—J. David Abernethy

[57] ABSTRACT

Disclosed is a ribbon cable subunit and a method of making same. The subunit is composed of a plurality of elongated fibers aligned one to another in a planar array with a predetermined number of the fibers bearing on their respective surfaces one or more discrete layers of ink which by themselves convey no intelligence but in combination with discrete layers of ink on other predetermined aligned optical fibers form a configuration conveying intelligence, and a transparent coating circumscribing and in contact with the optical fibers and the printed intelligence.

5 Claims, 1 Drawing Sheet

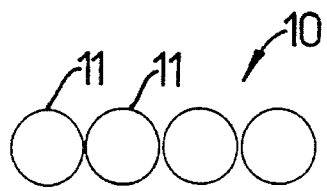
FIG. 1.
(PRIOR ART)
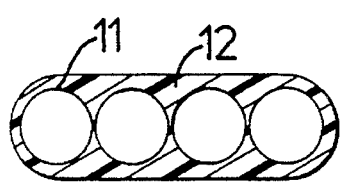
FIG. 2.
(PRIOR ART)
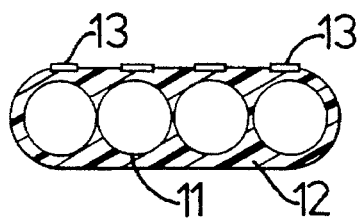
FIG. 3.
(PRIOR ART)
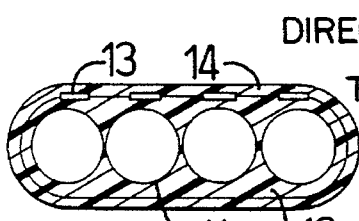
FIG. 4.
(PRIOR ART)
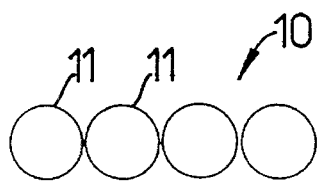
FIG. 5.
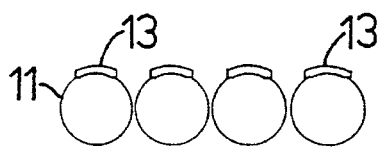
FIG. 6.
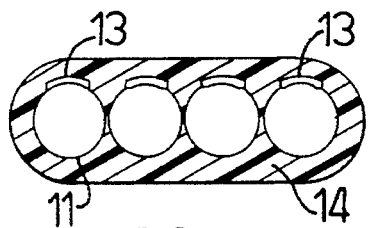
FIG. 7.
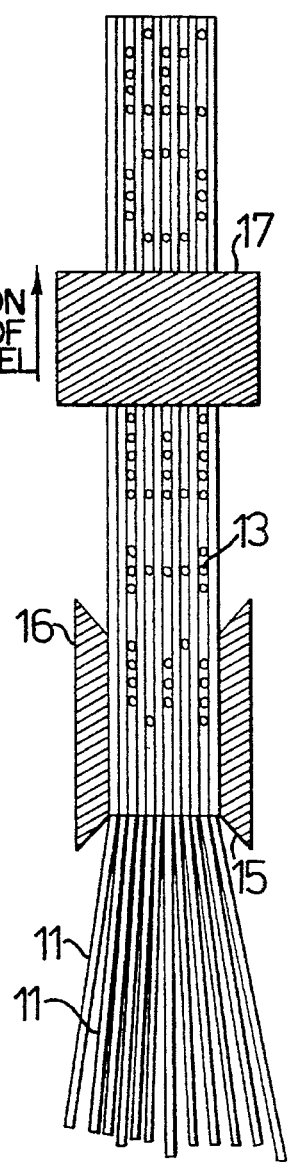
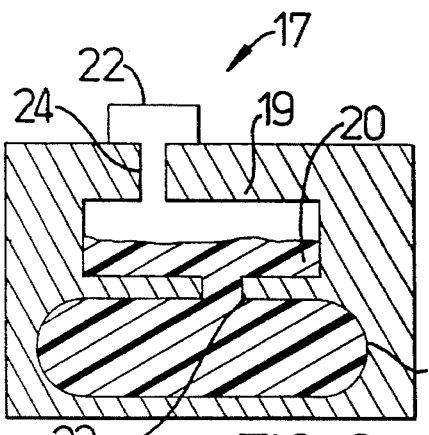
FIG. 8.
FIG. 9.
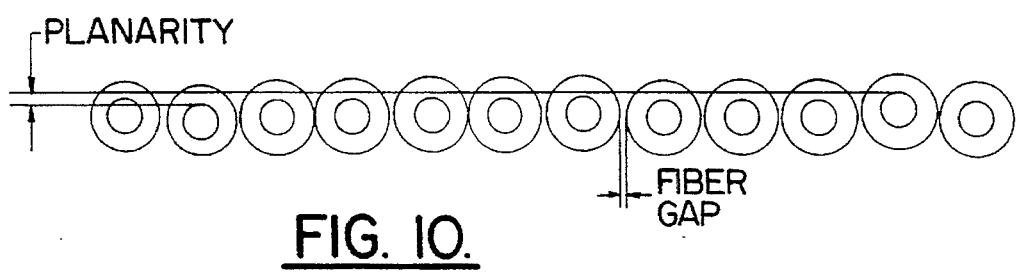
FIG. 10.

FIBER OPTIC RIBBON CABLE SUBUNIT BEARING PRINTED INFORMATION

BACKGROUND OF THE INVENTION

The invention deals with the method of producing a fiber optic ribbon cable subunit, bearing printed indicia.

DESCRIPTION OF THE PRIOR ART

Fiber optic cable comprises optical fiber, a glass fiber with a protective coating, typically acrylate or silicone, which may be packaged in subunits such as ribbons or bundles, and further combined in a cabling structure. Most fiber optic cable, including ribbon cable, carry information on their subunit's outer surface such as manufacturer's name, product number, unit number, and etc. . Such information is usually printed on the cable's subunit outer surface with an ink that is carried in a fluid base. The fluid carrier is driven off by heat or other means leaving the ink configured in the desired manner. Printing on the outside surface of a cable's subunit usually is unsatisfactory because the ink, after deposition, has a tendency to rub off or it is wiped off (transferred) onto an adjacent segment of the same cable subunit after it is placed upon a reel for storage or wiped off (transferred) onto an adjacent segment of another subunit in the same cable.

In the past, this problem as it pertains to ribbon type cable subunits has been attacked by the method of first bonding a plurality of side-by-side optical fibers one to another by circumscribing the optical fibers with a first plastic coating. Printing was done on the first coating. Subsequently, a second coating of transparent plastic material, either thermoplastic or UV curable cross-linkable, was circumscribed about the first coating. The above described method is a two step process, requiring more time to manufacture and materials than the invention.

A subunit of a ribbon cable as discussed herein is treated much in the same manner as one would treat a single optical fiber towards placing it in its intended environment. That is to say, the subunit(s) would be placed in a tube or slotted core, stranded about appropriate strength member(s), both metallic and otherwise. Examples of prior art subunits would be element 15 of U.S. Pat. No. 5,212,756, element 8 of U.S. Pat. No. 5,249,249 and element 4 of U.S. Pat. No. 4,826,279, the contents of which are incorporated herein by reference.

BRIEF SUMMARY OF THE INVENTION

The invention involves the following method steps:
(a) providing an aligning device capable of aligning a plurality of individual optical fibers in a side-by-side planar relationship;
(b) providing a printing device capable of disposing on a predetermined number of said optical fibers a layer of ink in a predetermined location as the aligned fibers are traversed along said alignment means;
(c) providing a coating device for coating the aligned optical fibers and the intelligence thereon;
(d) aligning the fibers in a side-by-side unbonded ribbon configuration and while so aligned;
(e) printing discrete layers of ink on a predetermined number of fibers, any one of said layers of ink per se conveying no intelligence except in combination (viewed collectively) with other optical fibers bearing discrete ink layers;
(f) circumscribing said aligned optical fibers with a transparent plastic.

The above described method differs from known prior art methods in two aspects: (1) by using only one coating to circumscribe intelligence bearing fibers, and (2) placing a discrete layer of ink on any given fiber that by itself conveys no intelligence, but does convey intelligence when viewed in combination (viewed collectively) with other discrete layers of ink deposited on other optical fibers and while holding the so ink layered fibers in alignment, passing them through coating apparatus where a coat of transparent plastic is coated thereover. Such a coat binds the fibers in a planer relationship to form a ribbon cable and to fix the inked fibers juxtaposed one to another in a composite configuration that the ink layers convey intelligence.

BRIEF DESCRIPTION OF THE DRAWINGS

FIGS. 1–4 are cross sections of prior art optical fibers involved in the formation of a fiber optic ribbon cable subunit. FIG. 1 shows side-by-side aligned optical fibers; FIG. 2 shows coating the aligned optical fibers of FIG. 1; FIG. 3 shows printing of intelligence on the coating applied as in FIG. 2, and FIG. 4 shows a second coating circumscribing the aligned coated optical fibers of FIG. 3.

FIGS. 5–7 are cross sections of optical fibers involved in the formation of optical fiber ribbon cable subunit made by the invention. FIG. 5 shows a side-by-side alignment of unbonded optical fibers in the manner shown by FIG. 1. FIG. 6 illustrates printing on the unbonded optical fibers of FIG. 5 and FIG. 7 illustrates a coating circumscribing the printed on unbonded aligned fibers of FIG. 6.

FIG. 8 is a schematic plan view of an alignment means, a printer and coating block used to manufacture the fiber optic ribbon cable of FIG. 7.

FIG. 9 is a schematic cross section of coating apparatus 17.

FIG. 10 is a cross sectional view of uncoated fibers aligned by an alignment means showing planarity and fiber gap tolerances of less than 20 and 5 μm respectively.

DETAILED DESCRIPTION OF THE INVENTION

The prior art method of manufacturing a fiber optic ribbon cable subunit bearing printed intelligence is shown by FIGS. 1–4. First, an aligned array 10 of optical fibers 11 are disposed in a side-by-side configuration as shown by FIG. 1. Second, the array 10 is coated with plastic 12 to bond fibers 11 together in their previously aligned configuration. See FIG. 2. Thirdly, predetermined intelligence 13 is printed on the outer surface of plastic 12, not on the fibers themselves. Lastly, another coating of plastic material 14 is applied to circumscribe the printed composite of FIG. 3.

The method steps of the invention is shown by FIGS. 5–7. First, an aligned array of optical fibers is formed like element 10 of FIGS. 1 and 5. Fibers 11 in this stage are not bonded, one to another. Second, aligned unbonded fibers receive printed ink layers 13 (discrete drops) directly on their outer surface. Any one of such ink layers 13 standing alone would convey no intelligence as such. Observe elements 13 of FIG. 10, where each of said elements 13 per se convey no intelligence. However, such elements 13 do convey intelligence when viewed in combination (viewed collectively) with other elements 13 on other fibers. The ink layers need no drying prior to the application of coating 14. Lastly, a transparent coating 14 is applied to the printed unbonded composite forming a bond fixing the alignment of fibers 11 in a ribbon like configuration. Only one coating is needed. The prior art uses two coats. Fibers 11 may be spaced apart from one another or they may be in contact with adjacent fibers. In the latter case, plastic coating 14 would not completely circumscribe fibers 11.

FIG. 8 is a schematic disclosure of the apparatus used to carry out the invention. Element 16 represents an alignment guide, element 15 represents an ink jet printer and down stream from elements 15 and 16, element 17 represents a coating block. Sources from which these items of apparatus and the materials used to carry out the invention are as follows:

1. Optical Fibers 11 can be obtained from Corning Incorporated, of Corning, N.Y.

2. An alignment means (or device) contains structure adapted to receive a plurality of optical fibers from a plurality of reels, positioned differently in three dimensional space, and align such fibers so that they are either spaced apart from or in contact with one another in a predetermined planar relationship one to another and maintain such relationship while the aligned fibers are passed through a printing and then a coating device where in the printing device discrete layers of ink are deposited on a predetermined number of fibers and in the coating device a plastic matrix is caused to circumscribe the aligned fibers and thereby fix the aligned fibers in their predetermined planar relationship. In addition, the alignment device should be able to hold the individual fibers in the planar relationship such that fiber planarity is less than 20 μm and the gaps between fibers are less than 5 μ.

3. Ink Jet Printer 15 can be obtained from Video Jet, Inc. of Elk Grove, Ill. Ink used in such printer may be procured from the same source. Other suppliers of ink jet printers are Widenbach Amelita Inc. of Vanoy, Calif. and Gen Gravure Co. Inc. of West Hanover, Mass. An ink jet printer contains the following structure: a container within which ink can be stored under pressure, a device connected to the container to supply pressure to the ink stored in such container, a channel connected to the container terminating in a suitable nozzle for delivering discrete drops of ink to a predetermined location on a predetermined optical fiber and a computer controlled means to cause such drops of ink to be deposited on a given optical fiber at a predetermined location in such a manner so that when such drops are viewed collectively they convey intelligence.

4. Coating Block 17 usually can be obtained from the same source as Alignment Guide 16.

5. Plastic 14 is a UV curable plastic and can be obtained from Borden of Cincinnati, Ohio; M. Huber Munchen GmbH of Munchen Germany and DSM Desotech Inc. of Elgin, Ill.

The ribbon is pulled through the alignment guide, printer and coating block at a speed that allows the ink to dry before entering the coating block 17 and is then cured by ultraviolet light, the source (not shown) of which may be in the Coating Block 17 itself or down stream therefrom. Any ink can be used that will wet the fiber and can be applied such that it will have a dot diameter of less than 500 μm and a height (thickness) of less than 10 μm, preferably less than 2 μm.

Most inks are so volatile that no drying means is necessary prior to coating. However, any commercially available dryer or even a fan may be used to make sure the inks dry before entering the coating block. A suitable UV light source can be obtained from Fusion Systems of Rockville, Maryland. Coating Block 17 may be of a construction that includes a die, through which printed fibers in ribbon alignment are traversed, the die being in communication with a chamber adapted to contain an acrylate plastic, such as urethane acrylate. A pump 22 supplies pressure to the transparent acrylate in the chamber causing it to flow through a communications channel 24 to die chamber 21 and onto the ribbon like aligned fibers carrying the desired printed intelligence. Applicant has found that such coating does not disturb the printing and once the acrylate coating is cured by the ultraviolet light, the coating provides a protection shield for the printing as well as a bonding means for printed fibers 11.

Element 17 of FIGS. 8 and 9 represents a coating block used to carry out the discussed invention. With reference to FIG. 9, element 18 is the side wall of coating block 17, element 19 represents a chamber in which UV curable plastic is disposed, element 22 is a source of pressure, and element 24 is a chamber connecting air pressure source 22 to chamber 19. Element 23 is another channel connecting chamber 19 with die chamber 21.

A variety of modifications which do not depart from the scope and spirit of the invention will be evident to persons of ordinary skill in the art from the disclosure herein. The following claims are intended to cover the specific embodiments set forth herein as well as such modifications, variations, and-equivalents.

What is claimed is:

1. A fiber optic ribbon comprising a plurality of elongated optical fibers aligned side-by-side one to another in a planar array, a figure formed by ink deposited partly on the outer surface of one of said optical fibers and deposited partly on the outer surface of another of said optical fibers, and a transparent coating circumscribing said optical fibers and said inked figure.

2. The ribbon cable subunit of claim 1 wherein the transparent coating is in contact with only a part of the surface of each optical fiber.

3. The method of making an optical fiber ribbon cable subunit comprising:

(a) traversing a plurality of optical fibers through an alignment means capable of aligning a plurality of optical fibers in a given plane, and aligning said fibers in a side-by-side ribbon configuration;

(b) thereafter traversing said aligned fibers through a printing means and printing on at least two of said optical fibers a figure formed by ink; and, (c) thereafter coating said aligned optical fibers in a transparent plastic medium, thereby fixing said optical fibers in said side-by-side alignment.

4. The method of claim 3 wherein said figure is formed by individual drops of ink.

5. The fiber optic ribbon cable subunit of claim 1 wherein said ink comprises individual dots.

\* \* \* \* \*